US009218140B2

(12) United States Patent
Antony

(10) Patent No.: US 9,218,140 B2
(45) Date of Patent: Dec. 22, 2015

(54) SYSTEM AND METHOD FOR SELECTIVELY UTILIZING MEMORY AVAILABLE IN A REDUNDANT HOST IN A CLUSTER FOR VIRTUAL MACHINES

(71) Applicant: VMware, Inc., Palo Alto, CA (US)

(72) Inventor: Jinto Antony, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 176 days.

(21) Appl. No.: 14/014,461

(22) Filed: Aug. 30, 2013

(65) Prior Publication Data

US 2015/0067284 A1 Mar. 5, 2015

(51) Int. Cl.
*G06F 3/06* (2006.01)
*G06F 11/16* (2006.01)
*G06F 9/455* (2006.01)
*G06F 12/08* (2006.01)

(52) U.S. Cl.
CPC .............. *G06F 3/065* (2013.01); *G06F 3/067* (2013.01); *G06F 3/0613* (2013.01); *G06F 3/0619* (2013.01); *G06F 9/45545* (2013.01); *G06F 11/1666* (2013.01); *G06F 12/084* (2013.01); *G06F 2009/45583* (2013.01); *G06F 2212/152* (2013.01); *G06F 2212/311* (2013.01)

(58) Field of Classification Search
CPC ....... G06F 3/061; G06F 3/0613; G06F 3/065; G06F 11/1666; G06F 2009/45545; G06F 2009/45583; G06F 2009/4557; G06F 12/0806; G06F 12/084; G06F 2212/152; G06F 2212/311
See application file for complete search history.

(56) References Cited

U.S. PATENT DOCUMENTS

| 2008/0114943 | A1* | 5/2008 | Holt ............................ 711/147 |
| 2011/0214005 | A1* | 9/2011 | Biran et al. .................... 714/1 |
| 2013/0339470 | A1* | 12/2013 | Jeswani et al. ................ 709/213 |
| 2014/0281131 | A1* | 9/2014 | Joshi et al. ................... 711/103 |

* cited by examiner

*Primary Examiner* — Hal Schnee

(57) ABSTRACT

Techniques for selectively utilizing memory available in a redundant host system of a cluster are described. In one embodiment, a cluster of host systems, with at least one redundant host system, with each host system having a plurality of virtual machines with associated virtual machine (VM) reservation memory is provided. A portion of a data store is used to store a base file, the base file accessed by all the plurality of virtual machines. A portion of the memory available in the redundant host system is assigned as spare VM reservation memory. A copy of the base file is selectively stored in the spare VM reservation memory for access by all the plurality of virtual machines.

24 Claims, 5 Drawing Sheets

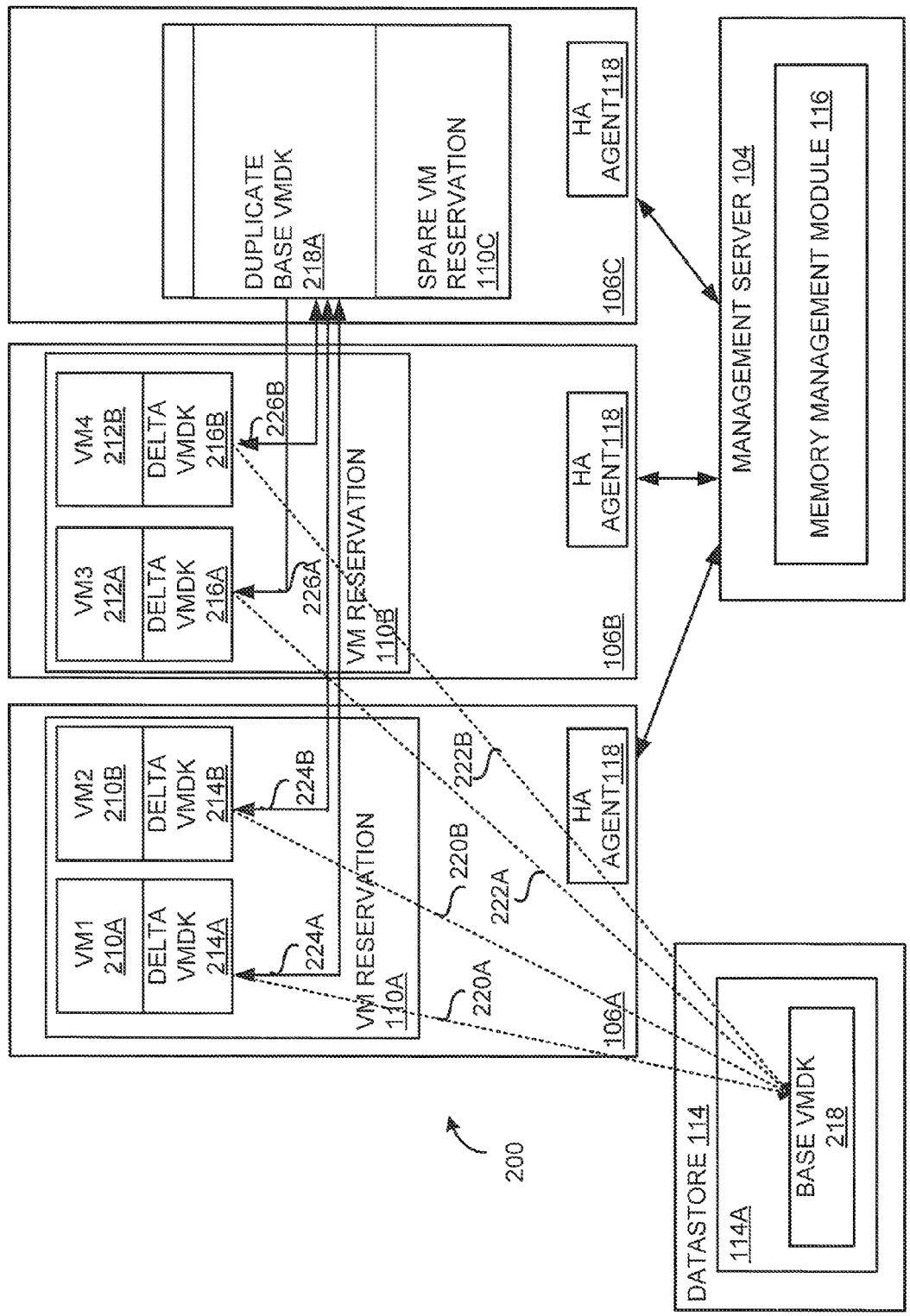

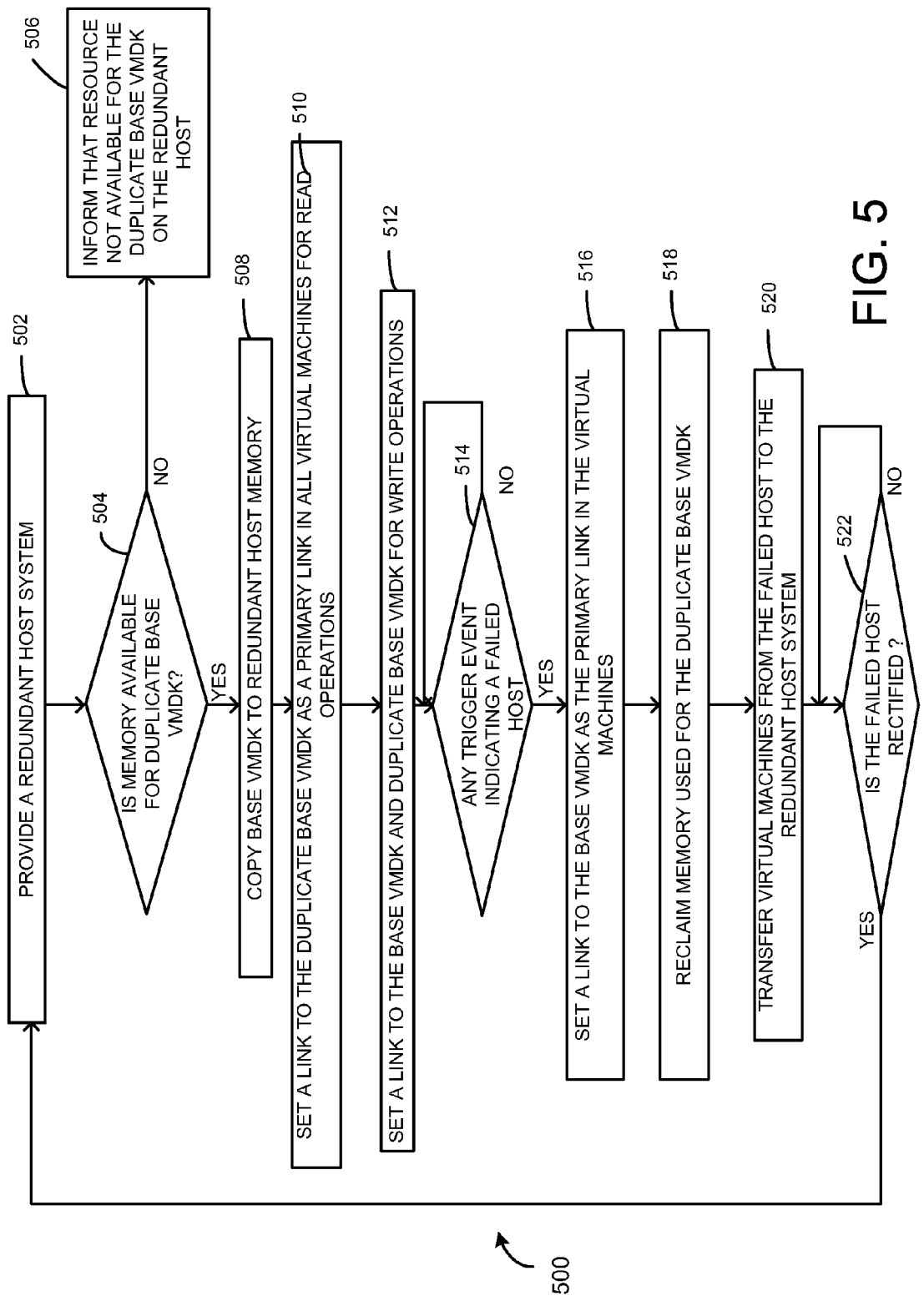

SYSTEM AND METHOD FOR SELECTIVELY UTILIZING MEMORY AVAILABLE IN A REDUNDANT HOST IN A CLUSTER FOR VIRTUAL MACHINES

BACKGROUND

Computer virtualization is a technique that involves encapsulating a representation of a physical computing machine platform into a virtual machine (VM) that is executed under the control of virtualization software running on hardware computing platforms (also referred to herein as "hosts" or "servers"). A group of hardware computing platforms may be organized as a cluster to provide hardware resources, such as memory, central processing units (CPUs) and so on, for virtual machines.

For virtual machines running in a group of hardware computing platform (for example, as a cluster), one or more redundant hardware computing platforms may be provided as a redundant host, available for selective use, for example, as a spare host (for example, to provide a high availability (HA) cluster). Although the redundant host will be live or active in the cluster, the redundant host will be awaiting a trigger event, to be utilized to host one or more virtual machines. As an example, the trigger event may be a failure, network isolation or improper operation of one or more of hosts in the cluster. When the redundant host is not configured as a host for virtual machines, resources of the redundant host, for example, memory resources may be underutilized.

BRIEF DESCRIPTION OF THE DRAWINGS

FIG. 2 is a block diagram showing portions of the cluster illustrating selective allocation of memory available in the redundant host computing system, according to an example embodiment.

FIG. 5 illustrates a flow diagram for selectively assigning memory available in a redundant host computing system, according to an example embodiment.

The drawings described herein are for illustration purposes only and are not intended to limit the scope of the present subject matter in any way.

DETAILED DESCRIPTION

Embodiments described herein provide enhanced computer-based and network-based methods, techniques, and systems for selectively utilizing memory available in a redundant host in a cluster with a plurality of hosts with virtual machines. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims.

For virtual machines running in a group of hardware computing platform (for example, as a cluster), one or more redundant hardware computing platforms may be provided as a redundant host, available for selective use, for example, as a spare host. Although the redundant host will be live or active in the cluster, the redundant host will be awaiting a trigger event, to be utilized as a host for one or more virtual machines. As an example, the trigger event may be a failure, network isolation, access, failure to access shared storage or improper operation of one or more of hosts in the cluster. When the redundant host is not configured as a host for virtual machines, resources of the redundant host, for example, memory resources may be underutilized.

As an example, memory resources that are reserved for allocation to individual virtual machines may not be used until the redundant host is configured as a host running a plurality of virtual machines. In some embodiments, memory resources available in a host may provide better performance than memory resource available external to the host, for example, data stores available over a network. Better performance may be available for one or more reasons, including a higher speed of memory, higher bus speeds, faster computing power, faster physical and logical network links, faster physical and logical storage links and the like.

The proposed technique utilizes memory resources reserved for allocation to individual virtual machines in a redundant host for selective use by the virtual machines. When a trigger event, for example, a failure of a host system occurs, selective use by the virtual machines is terminated and the reserved memory resources are utilized to transfer the virtual machines running on the failed host system.

System Overview and Examples of Operation

Figure 1:
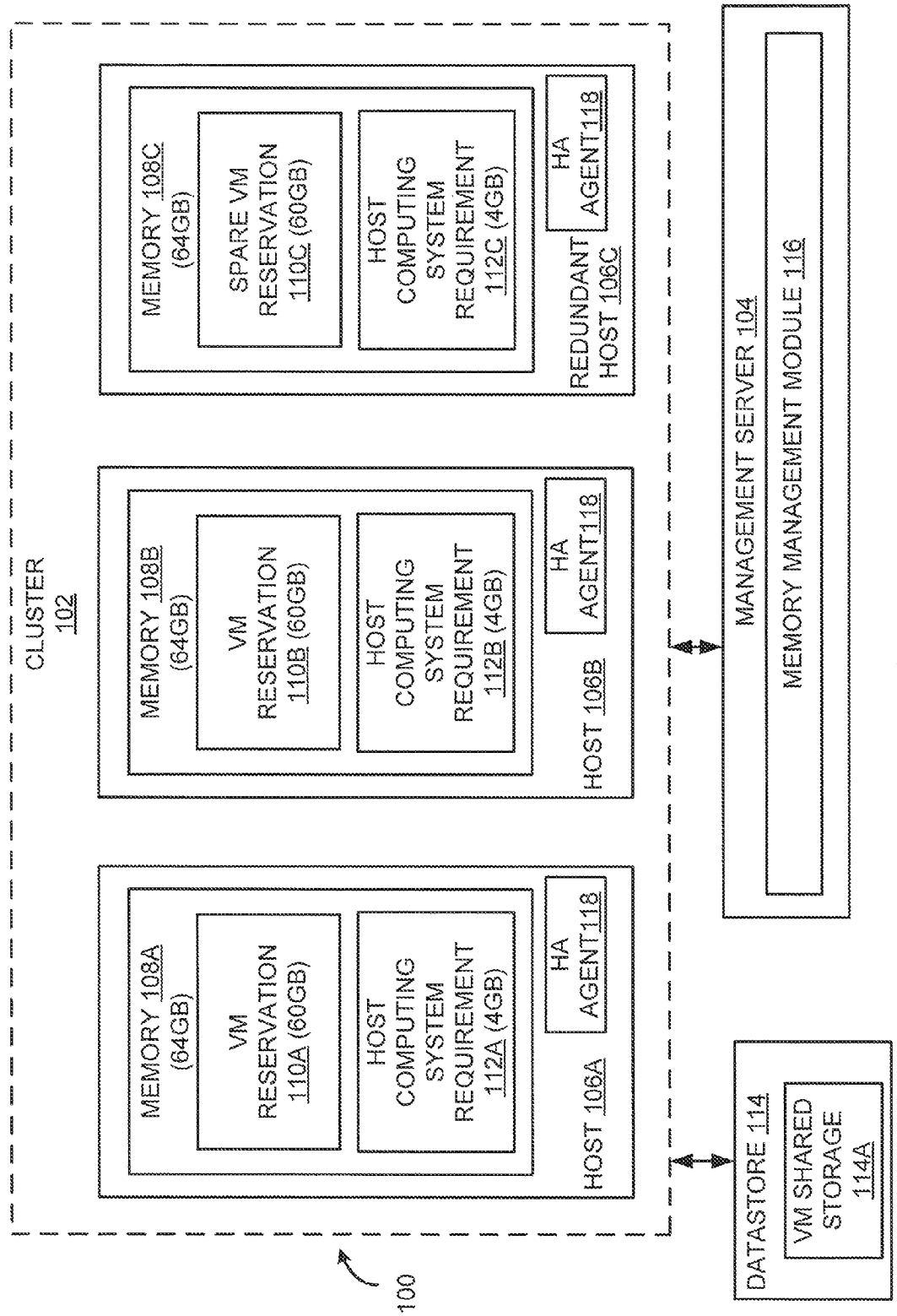
FIG. 1 is a block diagram of a cluster illustrating a plurality of host computing systems with a redundant host computing system, according to an example embodiment.

FIG. 1 is block diagram 100 of cluster 102 illustrating redundant host computing system 106C having memory reserved for allocation to individual virtual machines 110C, according to an example embodiment. Redundant host computing system 106C may sometimes be referred to as spare host computing system 106C or failover host computing system 106C. Memory reserved for allocation to individual virtual machines 110C in redundant host computing system 106C may be sometimes referred to as spare virtual machine (VM) reservation 110C or spare VM reservation memory 110C.

Particularly, FIG. 1 illustrates cluster 102 communicative with management server 104 and data store 114. In the example shown in FIG. 1, cluster 102 is described using two host computing systems 106A-B and redundant host computing system 106C, however, any number of host computing systems and any number of redundant host computing systems can be configured in cluster 102. As shown in FIG. 1, each of memories 108A-B includes a part of memory for host computing system requirements 112A-B and a part of memory for VM reservations 110A-B. Further, redundant host computing system 106C includes memory 108C, which includes a part of memory for host computing system requirement 112C and a part of memory as spare VM reservation 110C. VM reservations 110A-B represent memory that is collectively reserved for all virtual machines executing on each host computing system. Host computing system requirements 112A-C represent memory that is used by other host functions, such as memory used by a virtualization software layer (i.e., a hypervisor).

In the example shown in FIG. 1, each of memories 108A-C has a capacity of 64 GB. Out of 64 GB in each host computing system 106A-B, 4 GB is assigned for host computing system requirements 112A-B and 60 GB is assigned for VM reservations 110A-B. Further, out of 64 GB in redundant host computing system 106C, 4 GB is assigned for host computing system requirement 112C and 60 GB is available for spare VM reservation 110C.

Upon occurrence of a trigger event, it may be necessary to repurpose redundant host computing system 106C as a host computing system. As an example, a trigger event may indicate host computing system 106B is operationally unstable. Management server 104 monitors cluster 102 for any trigger event indicating a failed host. For example, management server 104 periodically communicates with high availability (HA) agent 118 running in each of host computing systems 106A-106C to monitor status of host computing systems 106A-C. If a a trigger event is sensed by management server 104 indicating a potential failure or diminished operation of a host system, management server 104 initiates operations to repurpose redundant host system 106C as a host system providing virtual machines.

For example, upon such a trigger event, all virtual machines running on host computing system 106B are transferred over to redundant host computing system 106C. For example, management server 104 may orchestrate transfer of all virtual machines running on host computing system 106B over to redundant host computing system 106C. For example, spare VM reservation 110C may be utilized to transition the virtual machines running on host computing system 106B. Upon transfer of the virtual machines running on host computing system 106B to redundant host computing system 106C, redundant host computing system 106C will become one of the host computing systems in cluster 102 providing virtual machines. The management server 104 may in one example, balance the load on host computing systems 106A-C that are part of cluster 102. Host computing system 106B may then be acted upon to remedy any errors or faults that resulted in generating the trigger event.

Data store 114 may be accessible by each of host computing systems 106A-B and redundant host computing system 106C. Data store 114 may be operatively coupled to cluster 102 by means of one or more physical and logical links. In some embodiments, data store 114 may be a shared storage device, accessible to multiple clusters of a system. Portions of data store 114 may be assigned for use by cluster 102. In some embodiments, portions of data store 114 assigned to cluster 102 may be accessible to host computing systems 106A-C in cluster 102. In some embodiments, portions of data store 114 may be assigned for use by the virtual machines running on various host computing systems. For example, portion of data store 114 may be designated as VM shared storage 114A, accessible by the virtual machines running on host computing systems in cluster 102, for example host computing systems 106A-B and redundant host computing system 106C.

As an example, one or more files may be stored in VM shared storage 114A for access by the virtual machines running on host computing systems 106A-B. In some embodiments, the files stored in VM shared storage 114A may be read only files. In some embodiments, the files stored in VM shared storage 114A may be read-write files. As one skilled in the art appreciates, various portions of data store 114 referred to herein may be physical portions or logical portions. Further, data store 114 may be spread amongst a plurality of physical storage devices.

Further as shown in FIG. 1, management server 104 includes memory management module 116. Management server 104 monitors host computing systems for any trigger events. Memory management module 116 monitors virtual machines (e.g., running on host computing systems 106A-B) in cluster 102 for any storage needs and assigns storage as necessary. For example, memory management module 116 may assign portions of data store 114 for use by one or more host computing systems 106A-B and redundant host computing system 106C. For example, memory management module 116 may assign VM shared storage 114A for use by the virtual machines running on host computing systems 106A-B. Memory management module 116 also determines memory available for spare VM reservation 110C in redundant host computing system 106C.

In one embodiment, memory management module 116 may selectively assign memory available for spare VM reservation 110C as an alternate to VM shared storage 114A. For example, spare VM reservation 110C may also be used to store one or more files stored in VM shared storage 114A. Each virtual machine running on host computing systems 106A-B may be selectively configured to access spare VM reservation 110C as a primary source to retrieve these one or more files. Each virtual machine running on host computing systems 106A-B may also be configured to access VM shared storage 114A to retrieve one or more files, if the virtual machines are unable to retrieve them from spare VM reservation 110C.

In an exemplary implementation, memory available for spare VM reservation 110C is assigned as an alternate to VM shared storage 114-A, the spare VM reservation 110C can be accessed remotely by the virtual machines running on host computing systems 106A-B using a remote direct memory access (RDMA)-enabled network connection, which is explained in detail in FIG. 2. For example, RDMA-enabled network connection is a technique by which remote memory (e.g., memory of redundant host computing system 106C) can be included in the local address space (e.g., of host computing systems 106A-B) via a network interface card (NIC). In some embodiments, a host bus interconnect that couples host computing systems 106A, 106B and 106C may be used to access spare VM reservation 110C in redundant host computing system 106C. As one skilled in the art appreciates, a host bus interconnect may be implemented over a separate physical link between host computing systems 106A, 106B and 106C.

FIG. 2 is block diagram 200 showing portions of cluster 102 illustrating selective allocation of memory available for spare VM reservation 110C to store a file for access by all virtual machines, according to an example embodiment. Particularly, FIG. 2 illustrates host computing system 106A running virtual machines 210A and 210B, designated as VM1 and VM2, respectively, for convenience. Host computing system 106B is running two virtual machines 212A and 212B, designated as VM3 and VM4, respectively. File delta VMDK 214A associated with virtual machine VM1 is also stored in VM reservation 110A. Similarly, files delta VMDK 214B, 216A and 216B are associated with virtual machines VM2, VM3 and VM4 respectively. Each one of delta VMDK files 214A, 214B, 216A and 216B are linked to another file (base VMDK 218) stored in VM shared storage 114A.

For example, an address or a pointer to a location of base VMDK 218 may be maintained in each virtual machines VM1-VM4 so as to access file base VMDK 218, as needed. In one embodiment, memory management module 116 may configure and initialize a pointer in each of virtual machines VM1-VM4, indicating location of the file base VMDK 218 in data store 114. As an example, based on the pointer stored in virtual machine VM1, virtual machine VM1 may access file base VMDK 218 over link 220A. Similarly, virtual machines VM2-VM4 may access file base VMDK 218 over links 220B, 222A and 222B, respectively. As one skilled in the art appreciates, links 220A, 220B, 222A and 222B may be logical links that permit access to file base VMDK 218 over a physical link, using one or more communication and storage protocols.

In this exemplary configuration, file base VMDK 218 is commonly shared by virtual machines VM1-VM4. However, virtual machine VM1 may use file delta VMDK 214A in combination with file base VMDK 218. Virtual machine VM2 may use file delta VMDK 214B in combination with file base VMDK 218 and the like. As one skilled in the art appreciates, such a configuration may permit a single copy of file base VMDK 218 to be shared by multiple virtual machines. In some embodiments, file base VMDK 218 may generally be a read only file which may be rarely modified during the operation of cluster 102. In some embodiments, file delta VMDK may represent portions of a file that may be specific to a particular virtual machine or portions of a file that may be frequently modified. For example, file base VMDK may be an executable file of an application and file delta VMDK may contain specific configuration information for the application, based on specific virtual machine executing the application.

According to an example embodiment of this disclosure, a copy of file base VMDK 218 is maintained in spare VM reservation 110C of redundant host computing system 106C, as duplicate base VMDK 218A file. File duplicate base VMDK 218A is accessible by virtual machines VM1-VM4, over a link. For example, an address or a pointer to a location of duplicate base VMDK 218A may be maintained in each virtual machine VM1-VM4 so as to access file duplicate base VMDK 218A, as needed. In one embodiment, memory management module 116 may configure and initialize a pointer in each virtual machine VM1-VM4, indicating location of file duplicate base VMDK 218A in spare VM reservation 110C.

As an example, based on the pointer stored in virtual machine VM1, virtual machine VM1 may access file duplicate base VMDK 218A over link 224A. Similarly, virtual machines VM2-VM4 may access file duplicate base VMDK 218A over links 224B, 226A and 226B, respectively. As one skilled in the art appreciates, links 224A, 224B, 226A and 226B may be logical links that permit access to file base VMDK 218 over a physical link, using one or more communication and storage protocols.

In some embodiments, virtual machines VM1-VM4 may access file duplicate base VMDK 218A stored in redundant host system 106C faster than file base VMDK 218 stored in data store 114. This may be due to one or more of hardware configuration, software configuration, storage or network protocol advantages in accessing spare VM reservation 110C in redundant host system 106C as compared to accessing file base VMDK 218 stored in data store 114. In some embodiments, RDMA-enabled network connection may be utilized to access file duplicate base VMDK 218A. In some embodiments, file duplicate base VMDK 218A may be accessed over a host bus interconnect that couples host computing systems 106A, 106B and 106C. In some embodiments, file duplicate base VMDK 218A may be stored in spare VM reservation 110C in a thin disk format. As one skilled in the art appreciates, data stored in a thin disk format take less space than a thick disk format. Thin disk format can be used based on availability of resources on failover host.

In some embodiments, each virtual machine VM1-VM4 is configured to access duplicate base VMDK 218A, instead of base VMDK 218 stored in data store 114. For example, memory management module 116 may set a link to the location of duplicate base VMDK 218A as a primary link to obtain file base VMDK 218. In some embodiments, memory management module 116 may set a link to the location of base VMDK 218 as a secondary link to obtain file base VMDK 218. For example, if a virtual machine is unable to timely retrieve duplicate base VMDK 218A file, the virtual machine may use the secondary link to access file base VMDK 218 stored in data store 114.

In yet another embodiment, if redundant host computing system 106C needs to be configured to host virtual machines, for example, upon a trigger event requiring the transfer of virtual machines running on one of host computing system 106A or 106B, memory management module 116 may set the link to location of base VMDK 218 as the primary link and remove the link to location of duplicate base VMDK 218A.

Figure 4:
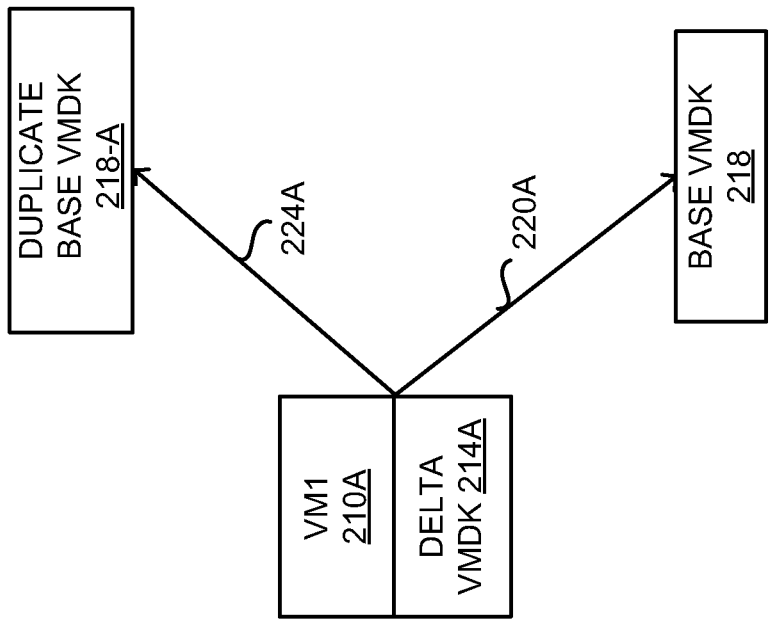
FIG. 4 is a block diagram illustrating the virtual machine accessing the duplicate base VMDK file and a base VMDK file during a write operation, according to an example embodiment.
Figure 3:
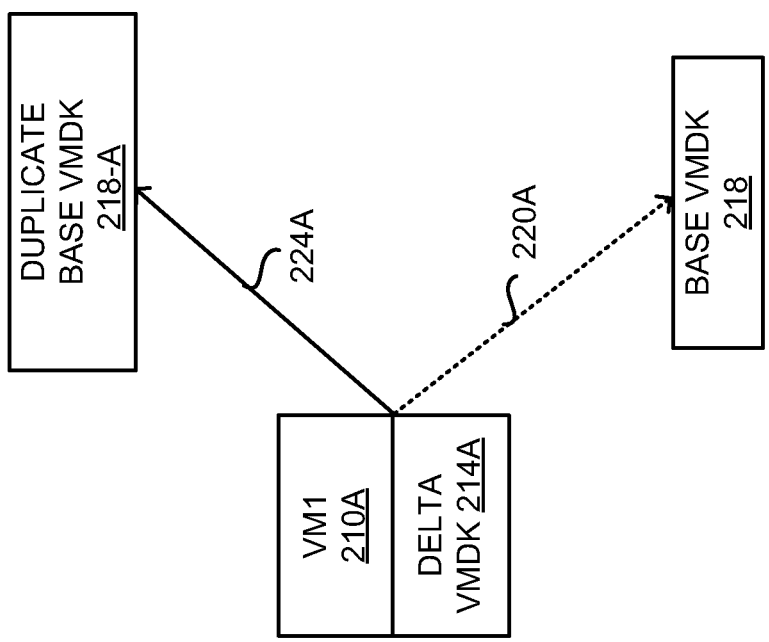
FIG. 3 is a block diagram illustrating a virtual machine accessing a duplicate base virtual machine disk (VMDK) file during a read operation, according to an example embodiment.

In one embodiment, referring to FIG. 3 and FIG. 4, an exemplary read and write operation will be described. FIG. 3 and FIG. 4 show virtual machine VM1 with associated file delta VMDK 214A, base VMDK 218 and duplicate base VMDK 218A. Virtual machine VM1 is configured to access base VMDK 218 over link 220A and access duplicate base VMDK 218A over link 224A. In this example, link 224A to duplicate base VMDK 218-A is set as the primary link and the link 220A to base VMDK 218 is set as the secondary link.

Now referring to FIG. 3, during a read operation, virtual machine VM1 will access duplicate base VMDK 218A over link 224A (shown by solid line). Link 220A to base VMDK 218 is shown in dotted line, to indicate its status as a secondary link. In one example, the secondary link is used if there are any problems in accessing duplicate base VMDK 218A over link 224A.

Now referring to FIG. 4, during a write operation, virtual machine VM1 will access both duplicate base VMDK 218A over link 224A and base VMDK 218 over link 220A to make modifications to both duplicate base VMDK 218A and base VMDK 218 (for example, shown by solid lines of links 224A and 220A). By modifying both base VMDK 218A and duplicate base VMDK 218A, a mirror copy of base VMDK 218 is maintained in spare VM reservation 110C.

Example embodiments described herein provide applications, tools, data structures and other support to implement memory management module 116 or similar logic to be used to selectively use spare VM reservation in a redundant host system to store files stored in a data store, for access by virtual machines. Other embodiments of the described techniques may be used for other purposes or in other contexts. For example, although described embodiments operate with respect to system or platform virtual machines (e.g., as managed by a hypervisor or virtual machine monitor), the techniques may be applicable with respect to process virtual machines (e.g., the Java virtual machine) or process scheduling at the operating system level. Virtual servers may also be governed by similarly selective resource allocation methods, including considerations such as what user groups or numbers of users are using a given virtual server and in what context.

Numerous specific details are set forth herein, such as data formats and code sequences, and the like, in order to provide a thorough understanding of the described techniques. The embodiments described also can be practiced without some of the specific details described herein, or with other specific details, such as changes with respect to the ordering of the logic, different logic, different architectures, or the like. Thus, the scope of the techniques and/or functions described are not limited by the particular order, selection, or decomposition of aspects described with reference to any particular routine, module, component, or the like.

Example Processes

FIG. 5 illustrates flow diagram 500 for selectively assigning memory available in a redundant host computing system, according to an example embodiment. In block 502, the redundant host system is provided. For example, redundant host system 106C is provided in cluster 102. In block 504, if memory is available for duplicate base VMDK is determined. For example, memory management module 116 may determine size of base VMDK 218 and determine if spare VM reservation 110C has sufficient memory to accommodate a copy of base VMDK 218. If sufficient memory is not available for the copy of base VMDK 218 using a file format used to store base VMDK 218, memory management module 116 may check to see if memory is available to accommodate the copy of base VMDK 218 in a different format. For example, the different format uses less space to store copy of a base file than space used to store the base file in a data store. One example format may be a thin disk format. If still space not available for a copy of base VMDK 218, in block 506, a report is generated by memory management module 116 to inform management server 104 that resources are not available for the duplicate base VMDK in the redundant host.

If sufficient memory is available for the copy of the base VMDK, in block 508, the base VMDK is copied to redundant host memory, to create a duplicate base VMDK. For example, management server 104 may initiate the operation to copy file base VMDK. In some embodiment, a file format different than file format used to store base VMDK 218 may be used to create duplicate base VMDK. Such a file format may result in a smaller file size for duplicate base VMDK than file size of base VMDK.

In block 510, a link to duplicate base VMDK is set in all virtual machines. This link to the duplicate base VMDK is set as a primary link for read operations by the virtual machines. Memory management module 116 may set the link to the duplicate base VMDK in the virtual machines.

In block 512, a link to the base VMDK and the duplicate base VMDK is set in the virtual machines for write operations by the virtual machines. Memory management module 116 may set the link to the base VMDK and the duplicate base VMDK in the virtual machines for the write operations by the virtual machines.

In block 514, management server 104 monitors cluster 102 for any trigger event indicating a failed host. For example, management server 104 periodically communicates with HA agent 118 running in each host computing system 106A-106C to monitor status of host computing systems 106A-106C. If a trigger event is sensed by management server 104 indicating a potential failure or diminished operation of a host system, in block 516, management server 104 sets the link to the base VMDK as the primary link in the virtual machines. For example, memory management module 116 of management server 104 may set the link to the base VMDK as the primary link in the virtual machines.

In block 518, the memory used for the duplicate base VMDK is reclaimed. For example, memory management module 116 may reclaim the memory used for the duplicate base VMDK so as to reconfigure spare VM reservation 110C for use by redundant host system 106C.

In block 520, all virtual machines running on the failed host system is transferred to the redundant host system. For example, management server 104 may communicate with redundant host system 106C to transfer the virtual machines from the failed host system, by creating new virtual machines using spare VM reservation 110C.

In block 522, whether the failed host is rectified and available for reuse is determined. For example, management server 104 determines if failed host system is rectified and available for reuse. If the failed host system is available for reuse, management server 104 determines which one of the hosts in cluster 102 should be used as the redundant host. Based on this determination, management server 104 selects a host and in block 502, the selected host is provided as the redundant host system.

As one skilled in the art appreciates a failed host may not mean a completely inoperable host computing system. In some examples, a trigger event may be generated when one or more host computing system is impaired or overloaded, for example, due to excessive use of resources. One possible remedial action may be to transfer some virtual machines running on the impaired or overloaded host computing system to the redundant host.

Systems and methods as described in FIGS. 1-5 may provide one or more of improved I/O performance of virtual machines, redundancy for certain files accessed by the virtual machines and improved utilization of available computing resources. For example, I/O performance of a duplicate base VMDK created using memory available in a redundant host system can be better than I/O performance of a base VMDK created using a data store, for example, external disks because speed of physical memory (i.e., memory available in redundant host system) is significantly faster than storage available in the data store. As another example, by providing links to both duplicate base VMDK and base VMDK, the virtual machines have redundancy for accessing the base VMDK. As yet another example, by utilizing spare VM reservation memory in the redundant host system, a portion of memory and system that would otherwise be idle, awaiting the trigger event results in an improved utilization of available resources.

Although certain terms are used primarily herein, other terms could be used interchangeably to yield equivalent embodiments and examples. For example, it is well-known that equivalent terms in the field of system virtualization or similar or related fields could be substituted for such terms as "physical computer," "hypervisor," "virtual machine," or the like. Specifically, the term "hypervisor" may be used interchangeably with "virtual machine monitor," "virtual machine supervisor," "virtual machine manager," or the like. In addition, terms may have alternate spellings which may or may not be explicitly mentioned, and all such variations of terms are intended to be included.

Example Computing System Implementation

Figure 6:
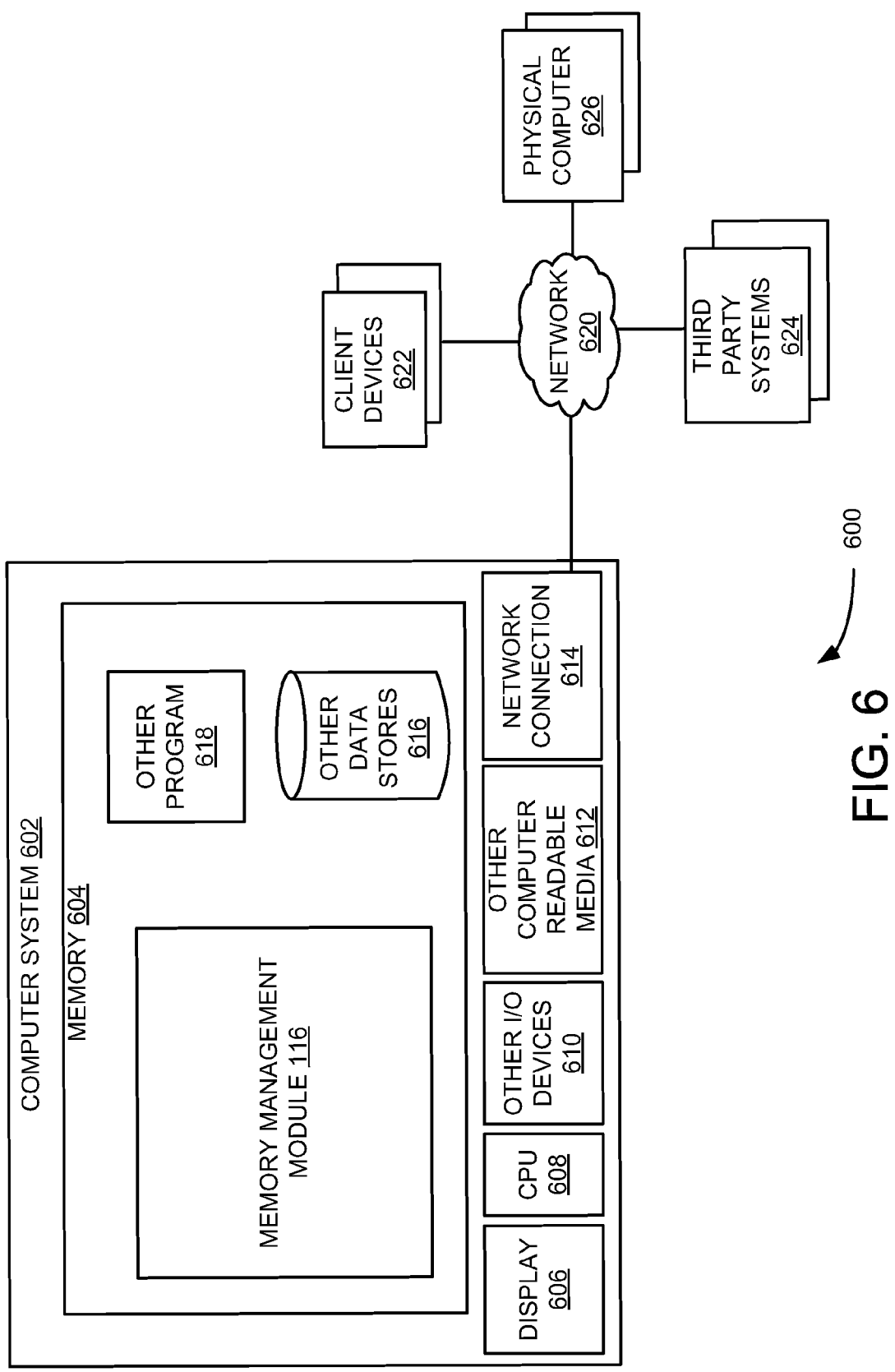
FIG. 6 is a block diagram of an example physical computing system including a memory management module, according to an example embodiment.

FIG. 6 is block diagram 600 of example physical computing system 602 (such as management server 104 shown in FIGS. 1-2) including memory management module (such as memory management module 116 shown in FIGS. 1-2) according to an example embodiment. In particular, FIG. 6 shows physical computing system 602 that may be utilized to implement memory management module 116.

Note that one or more general purpose virtual or physical computer systems suitably instructed may be used to implement memory management module 116. In addition, physical computing system 602 may comprise one or more distinct computing systems/devices and may span distributed locations. Furthermore, each block shown may represent one or more such blocks as appropriate to a specific embodiment or may be combined with other blocks. Also, memory management module 116 may be implemented in software, hardware, firmware, or in some combination to achieve the capabilities described herein.

In the embodiment shown, physical computing system 602 may comprise computer memory ("memory") 604, one or more Central Processing Units ("CPU") 606, input/output devices 608 (e.g., keyboard, mouse, etc.), other computer-readable media 610, and network connections 612. Memory management module 116 is shown residing in memory 604. The components of memory management module 116 may execute on one or more CPUs 606 and implement techniques described herein. Other code or programs 616 (e.g., an administrative interface, a Web server, and the like) and potentially other data repositories, such as data store 614, may also reside in memory 604, and execute on one or more CPUs 606. One or more of the components in FIG. 6 may not be present in any specific implementation. For example, some embodiments may not provide other computer readable media 610. Further, some embodiments may provide a display in physical computing system 602.

Memory management module 116 interact via a network with host computing systems in the Cluster. The components of memory management module 116 may record and/or communicate various types of information, including activity information (e.g., indications of importance, indications of activities occurring on virtual machines, indications of application actions/events and/or virtual machine/desktop states that may be used to determine the occurrence of an activity), resource allocation information (e.g., indications of shares or reservations assigned to particular virtual machines), and the like. Activity information written to data store 614 may be persisted to other computer readable media 610 or to a remote persistent memory storage location (not shown).

The embodiments described above may use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

Furthermore, in some embodiments, some or all of the components of systems described herein may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a non-transitory computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques.

From the foregoing it will be appreciated that, although specific embodiments have been described herein for purposes of illustration, various modifications may be made without deviating from the spirit and scope of this disclosure. For example, the methods, techniques, and systems for dynamic resource allocation are applicable to other architectures or in other settings. Also, the methods, techniques, and systems discussed herein are applicable to differing protocols, communication media (optical, wireless, cable, etc.) and devices (e.g., desktop computers, wireless handsets, electronic organizers, personal digital assistants, tablet computers, portable email machines, game machines, pagers, navigation devices, etc.).

The invention claimed is:

1. A method, comprising:
providing a cluster of host systems, with at least one redundant host system, with each host system providing a plurality of virtual machines with associated virtual machine (VM) reservation memory;
storing a base file in a portion of a data store, the base file accessed by the plurality of virtual machines;
assigning a portion of the memory available in a redundant host system from the at least one redundant host system as spare VM reservation memory; and
selectively storing a copy of the base file in the spare VM reservation memory for access by the plurality of virtual machines;
wherein upon a trigger event requiring transfer of virtual machines running on one of the host systems to the redundant host system,
redirecting the access to the base file from the spare VM reservation memory to the portion of the data store; and
transferring virtual machines running on one of the host systems to the redundant host system, by utilizing the spare VM reservation memory.

2. The method of claim 1, wherein the copy of the base file is accessed by the virtual machines, for all read operations to the base file.

3. The method of claim 2, wherein the copy of the base file and the base file are accessed by the virtual machines, for all write operations to the base file.

4. The method of claim 2, wherein each of the virtual machines include a delta file, each of the delta files linked to the base file.

5. The method of claim 1, wherein the copy of the base file is accessed by the virtual machines over a link configured to access the copy of the base file faster than accessing the base file stored in the data store.

6. The method of claim 1, wherein the copy of the base file is stored in a format different than a format used to store the base file in the data store and wherein the different format uses less space to store the copy of the base file than the base file in the data store.

7. The method of claim 6, wherein the copy of the base file is stored in a thin disk format.

8. The method of claim 1, wherein assigning the portion of the memory and selectively storing the copy of the base file are performed in response to determining that the memory available in the redundant host system is sufficient to store the copy of the base file.

9. A system comprising:
a cluster of host systems, with at least one redundant host system, with each host system having a plurality of virtual machines with associated virtual machine (VM) reservation memory; and
a portion of a data store to store a base file, the base file accessed by the plurality of virtual machines, wherein,
a portion of memory available in the a redundant host system from the at least one redundant host system is assigned as spare VM reservation memory; and
a copy of the base file is selectively stored in the spare VM reservation memory for access by the plurality of virtual machines, and wherein,
upon a trigger event that requires transfer of virtual machines running on one of the host systems to the redundant host system,
access to the base file is redirected from the spare VM reservation memory to the portion of the data store; and
virtual machines running on one of the host systems are transferred to the redundant host system, by utilizing the spare VM reservation memory.

10. The system of claim 9, wherein the copy of the base file is accessed by the virtual machines, for all read operations to the base file.

11. The system of claim 10, wherein both the copy of the base file and the base file are accessed by the virtual machines, for all write operations to the base file.

12. The system of claim 10, wherein each of the virtual machines includes a delta file, each of the delta files linked to the base file.

13. The system of claim 9, wherein the copy of the base file is accessed by the virtual machines over a link configured to access the copy of the base file faster than accessing the base file stored in the data store.

14. The system of claim 9, wherein the copy of the base file is stored in a format different than a format used to store the base file in the data store and wherein the different format uses less space to store the copy of the base file than the base file in the data store.

15. The system of claim 14, wherein the copy of the base file is stored in a thin disk format.

16. The system of claim 9, wherein the copy of the base file is selectively stored in response to determining that the memory available in the redundant host system is sufficient to store the copy of the base file.

17. A non-transitory computer-readable storage medium including instructions that are configured, when executed by a computing system, to perform:
providing a cluster of host systems, with at least one redundant host system, with each host system providing a plurality of virtual machines with associated virtual machine (VM) reservation memory;
storing a base file in a portion of a data store, the base file accessed by the plurality of virtual machines;
assigning a portion of the memory available in a redundant host system from the at least one redundant host system as spare VM reservation memory; and
selectively storing a copy of the base file in the spare VM reservation memory for access by the plurality of virtual machines,
wherein upon a trigger event requiring transfer of the plurality of virtual machines running on one of the host systems to the redundant host system,
redirecting the access to the base file from the spare VM reservation memory to the portion of the data store; and
transferring the plurality of virtual machines running on one of the host systems to the redundant host system, by utilizing the spare VM reservation memory.

18. The non-transitory computer-readable storage medium of claim 17, wherein the copy of the base file is accessed by the virtual machines, for all read operations to the base file.

19. The non-transitory computer-readable storage medium of claim 18, wherein the copy of the base file and the base file are accessed by the virtual machines, for all write operations to the base file.

20. The non-transitory computer-readable storage medium of claim 18, wherein each of the virtual machines includes a delta file, each of the delta files linked to the base file.

21. The non-transitory computer-readable storage medium of claim 17, wherein the copy of the base file is accessed by the virtual machines over a link configured to access the copy of the base file faster than accessing the base file stored in the data store.

22. The non-transitory computer-readable storage medium of claim 17, wherein the copy of the base file is stored in a format different than the format used to store the base file in the data store and wherein the different format uses less space to store the copy of the base file than the base file in the data store.

23. The non-transitory computer-readable storage medium of claim 22, wherein the copy of the base file is stored in a thin disk format.

24. The non-transitory computer-readable storage medium of claim 17, wherein assigning the portion of the memory and selectively storing the copy of the base file are performed in response to determining that the memory available in the redundant host system is sufficient to store the copy of the base file.

* * * * *